TELETYPE CONVERTER SYSTEM
Filed Nov. 6, 1964
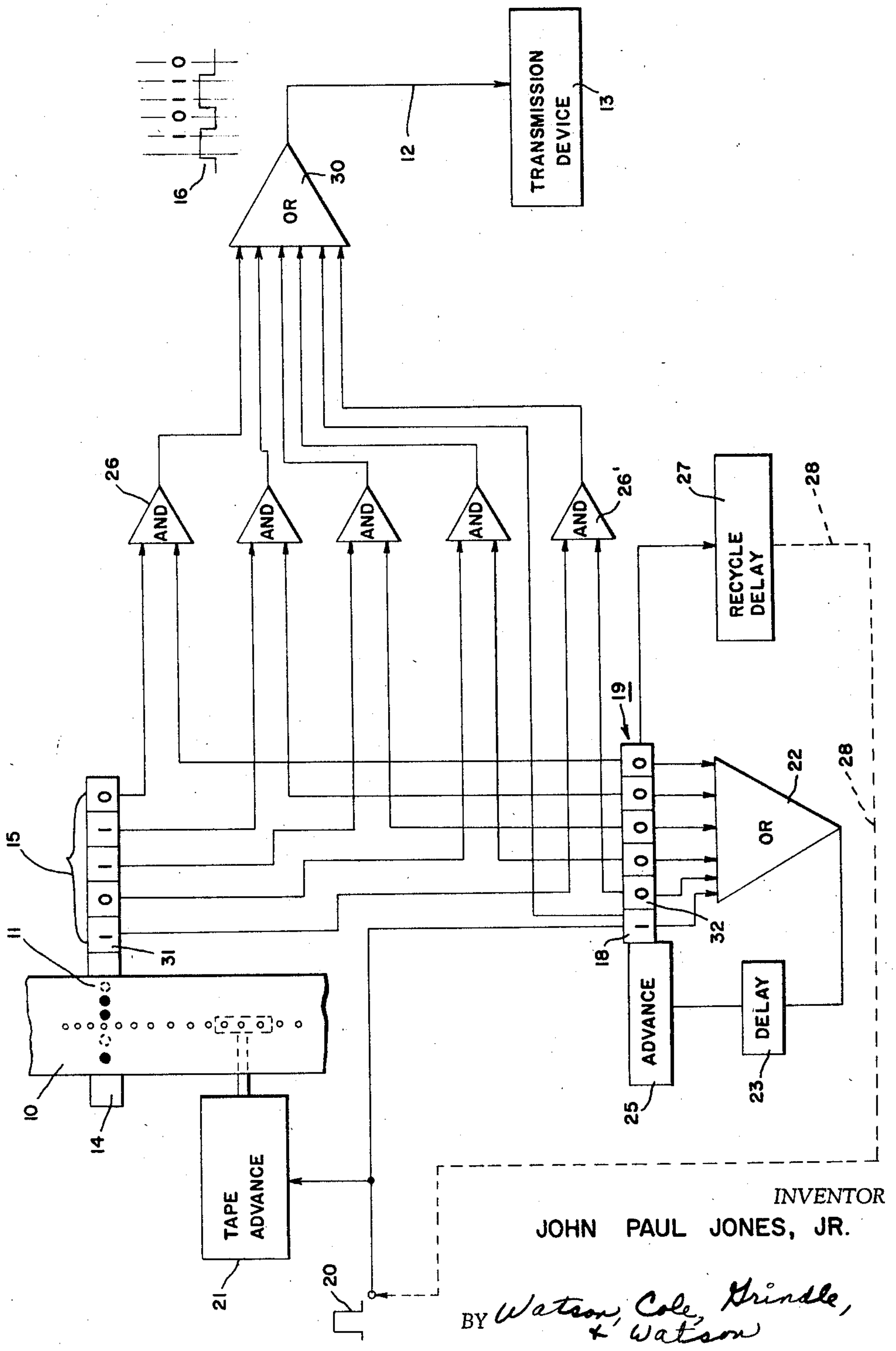
INVENTOR
JOHN PAUL JONES, JR.
BY Watson, Cole, Grindle, & Watson
ATTORNEY 3,396,382

TELETYPE CONVERTER SYSTEM

John Paul Jones, Jr., Wynnewood, Pa., assignor to Navigation Computer Corporation, a corporation of Pennsylvania Filed Nov. 6, 1964, Ser. No. 409,394
7 Claims. (Cl. 340—347)

ABSTRACT OF THE DISCLOSURE

A code conversion system useful in telemetering applications such as paper tape to telephone line converter devices provides for reading a multiple digit number or word presented in parallel form as across a tape column into serial form for presentation over the telephone or communication line. A shift register is employed to provide timing and sequencing of the data digit by digit into the communication channel, and each shift of data in this register generates an automatic shift pulse for the next step until the digits of the number or word are exhausted.

This invention relates to Teletype converter systems and more particularly it relates to systems usable for Teletype communications which process coded digital words into a sequence of serially presented signals suitable for conveyance along a single communication channel.

In order to transmit digital data derived from data processing equipment or coded tapes over a single transmission channel such as a telegraph wire or a telephone line, the data is generally derived in the form of a multiple bit word coded in binary form and transformed into a sequence of serially presented binary signals or bits which may be transmitted in the form of either impulses or tones over a single channel. In order to transform parallel data into serially presented information some sort of a scanning technique must necessarily be employed.

In the prior art this sort of equipment has involved the use of oscillators for controlling the timing at which each of the parallel bits of a data word is scanned in order to permit a reasonably uniform time between the bits presented in serial form for transmission on the Teletype lines, or the like. However such techniques have been fraught with difficulties, because where oscillators are used, there is always a possibility that an erratic operation will occur at the start of a scanning cycle because an oscillation has not occurred at the proper instant for starting a word but the oscillator is somewhere in a transition state, which will cause possible mistiming of the scanning sequence or loss of one of the necessary bits. This can be corrected with elaborate equipment which provides timed gating of full pulses from an oscillator so that a series of timed pulses may be derived from the oscillator for control of the scanning of the bits in a parallel presented word. Such equipment is exemplified by U.S. Patent No. 2,536,035. However in this type of equipment both an oscillator and a gating circuit is required and in addition a counter which will count the number of required pulses to correspond with the length of the data word. Thus an elaborate array of equipment is required for the parallel to serial transformation of data for transmission into a Teletype line.

Thus, it is an object of the present invention to provide a parallel to serial conversion system for use in the transmission of Teletype data which is simple and reliable, and which operates purely upon introduction of a start pulse and does not depend upon operation of auxiliary timing circuits, external oscillators or counting devices.

Therefore in accordance with the present invention a parallel to serial converter system is afforded which utilizes a shift register to perform those functions formally requiring an oscillator together with gating and counting circuits. This shift register has a starting pulse signal placed therein for each word, which is advanced from stage to stage in order to time and gate a sequence of bits from the parallel data into serial transmission form. In accordance with this invention the shift register is self-advanced by means of a feed-back loop provided to receive signals entering each stage of the shift register and feed them to the advancing circuits through a delay line. Therefore as the start pulse advances from stage to stage it can time and gate the various bits in the desired parallel word to be transformed into serial form. This provides a reasonably uniform time basis for spacing of the serial bits as they are merged together for entry into a single transmission channel.

A system constructed in accordance with these principles of the invention is shown in the single figure of the drawing in block diagram form.

Referring to drawing, it may be presumed that a series of input parallel words can be taken from a length of Teletype tape 10 for example which has a series of holes 11 punched therein in columns representing parallel binary words. It may also be seen from the figure that this information is to be merged in serial form at a single channel output line 12 for conveyance into a transmission device 13 which will then transmit the information in serial form bit by bit over a single channel. Thus the transmission device might be for example a telegraph circuit or a tone generator which permits the information to be sent over a standard telephone line. Although the input tape 10 is representative of the nature of input information, it may be recognized that a parallel word may be obtained from other sources such as register stages in a digital computer, and so forth.

If the reading device 14 is considered to be a photoelectric reader which determines the status of the parallel word which is in punched tape form, then the word may be represented in binary form at five different output channels 15, which could correspond to an output register in some other sort of data input device. Thus corresponding to the punched information on the tape 10, the word in the output channels 15 would represent the sequence of binary bits 10110. These bits are shown as they would appear in pulse form at the output line 12 by way of wave form 16 which has markers to indicate a sequence of time periods. To identify each word a start pulse 20 may be provided to advance each word into the reader and to identify the start of a word at the initial time period of waveform 16 by means of the auxiliary circuit 17. Thus, the initial starting pulse when introduced into the first stage 18 of shift register 19 is passed through line 17 into OR circuit 30 to produce a "1" at the start of each new word. Thus the circuit 17 always serves to provide for the initial bit of a serially presented word the one pulse as derived from the output of the first stage 18 of the shift register. These shift register output pulses are derived as long as the bit remains in the stage and a typical shift register for providing such operation is described in my copending application Ser. No. 335,642, filed Jan. 3, 1964, although any conventional flip-flop shift register, or the like, may be used.

The shift register 19 has five succeeding stages to correspond with the five bits of the data word to be converted in this particular embodiment, and the succeeding five time periods as the start bit 10 is passed from stage to stage, are used for the scanning and serial coding of data for single channel transmission.

Now considering operation of the system, assume that the initial start pulse 20 is provided which is introduced into the tape advance device 21, which in this embodiment serves to present a new Teletype word into the photo reader 14 for presentation at the output channels 15 each time a new pulse 20 is received. Equivalent apparatus in some other input device would in response to the pulse 20 provide insertion of another word at a register having the word presented at a plurality of parallel corresponding output channels 15. In addition to this function, the start pulse 20 also is introduced into the first stage 18 of the shift register 19. As may be seen at each stage of the shift register, there is an output line which connects to OR circuit 22, so that as each pulse is introduced into corresponding stage it provides an output pulse which is passed through a delay circuit 23 and into the advancing circuit 25 which serves to pass the entered bit 1 in the initial stage 18 from stage to stage along the shift register 19. Thus the bit will be passed along the register until it enters the output lead at the last stage where it is lost unless a recycle mode of operation is used which produces a recycle delay circuit 27 which passes the pulse through an optional circuit represented by dotted line 28 back into the input terminal to provide the next appropriate start waveform 20. In this mode of operation therefore the tape would be advanced automatically or the next digital word presented in order and the system will automatically advance from word to word after each word has been completely presented in serial form.

The coding operation itself takes place in the AND circuits 26 and the OR circuit 30. Thus, consider the initial bit 1 in the input channel 31 which is processed by a timed pulse at the second stage 32 of the shift register, through the corresponding AND circuit 26'. Thus, in operation as the "1" is shifted into the second stage 32 of the shift register it serves to select the signal representing the one stored in the first channel 31 of the word presentation means and gate this first bit through the AND circuit 26' into the OR circuit 30, which mixes in sequence the various inputs from the different AND circuits 26 to the result in the output waveform 16. The initial data bit therefore is combined as shown in waveform 16 with the waveform start pulse derived from the first stage 18 of the shift register. Each subsequent bit is thereby scanned in turn by succeeding stages of the shift register corresponding to the succeeding channels of the input data word as provided by the remainder of the AND circuits 26. Thus, it is shown that the single shift register 19, without help of an external oscillator or counter, serves to both time and scan the information from the parallel register 15 of the input device and present the information in the serial form for transmission into any desired single channel utilization device.

Having therefore provided an improved and simplified Teletype conversion system, those features believed representative of the nature of the present invention are defined with particularity in the following claims.

What is claimed is:

1. A system for parallel to serial conversion of binary coded data comprising in combination, means for presenting prearranged groups of electronic signals comprising a plurality of bits of binary coded data, a multiple stage shift register, means entering a bit of data into said shift register, means advancing a bit of data from stage to stage along said shift register, feedback means producing a signal from any stage of said shift register as data is advanced therein, delay means coupling said signal to said advancing means to cause automatic shift of data entered into said register along said register until it reaches the last stage, a mixing device for reviewing data from a plurality of channels, a separate gating circuit coupled to receive each bit of binary coded data in said groups, said gating circuits being connected to form the plurality of channels for said mixing device, a circuit connected from different shift register stages to each of said gating circuits to time the gating of the corresponding bit into said mixer circuit, and means coupled to said mixing circuit for utilizing binary bits presented in serial sequence.

2. A system as defined in claim 1 wherein the means for presenting the prearranged groups of signals comprises a tape reading unit.

3. A system as defined in claim 1 including means intercoupling the means entering a bit of data into said shift register with means for supplying a different of said prearranged groups of signals.

4. A system as defined in claim 3 including delay means for feeding back a bit from the last stage of said shift register to said means entering the data into the shift register to thereby provide automatic recycling control.

5. A parallel to serial conversion system comprising in combination, a multi-stage shift register, a starting device for entering a starting pulse into one stage of said shift register, a data access device providing a data word comprising several binary bits corresponding to further stages of said shift register, means coupled to said shift register deriving a signal as said pulse is passed from stage to stage, and means feeding said signal back to advance said entered pulse from stage to stage in said shift register automatically, and means coupled for reading bits from said access device successively into a single channel at time periods specified by the bit in said shift register as it passes from stage to stage.

6. A system as defined in claim 5 wherein said data access device includes advancing means sequentially providing different data words, and means is coupled to receive said pulse at the last stage of the shift register during one readout cycle and therewith both to actuate said advancing means and to re-enter the pulse into said shift register for initiating another readout cycle, thereby providing automatic word advance operation in said system.

7. A system as defined in claim 5, wherein said data access device is a register separate from said shift register storing said bits statically, gating circuits are provided for passing each stored bit in the data access device into said single channel, and said gating circuits are respectively coupled with said further stages of the shift register for response to said signal at the respective stages of the shift register to thereby open the corresponding gating circuits and pass the associated stored bit into said channel.

References Cited

UNITED STATES PATENTS

| | | | |
|---|---|---|---|
| 2,801,406 | 7/1957 | Lubkin | 340—173 |
| 2,982,953 | 5/1961 | Cadden et al. | 340—347 |
| 3,051,940 | 8/1962 | Fleckenstein | 340—347 |
| 3,090,034 | 5/1963 | Fredericks et al. | 340—172.5 |
| 3,117,754 | 1/1964 | Morganstern | 246—2 |
| 3,199,099 | 8/1965 | Nassimbene | 340—347 |
| 3,221,326 | 11/1965 | Lawhon | 340—347 |

MAYNARD R. WILBUR, *Primary Examiner.*

W. J. KOPACZ, *Assistant Examiner.*